Figure 1:
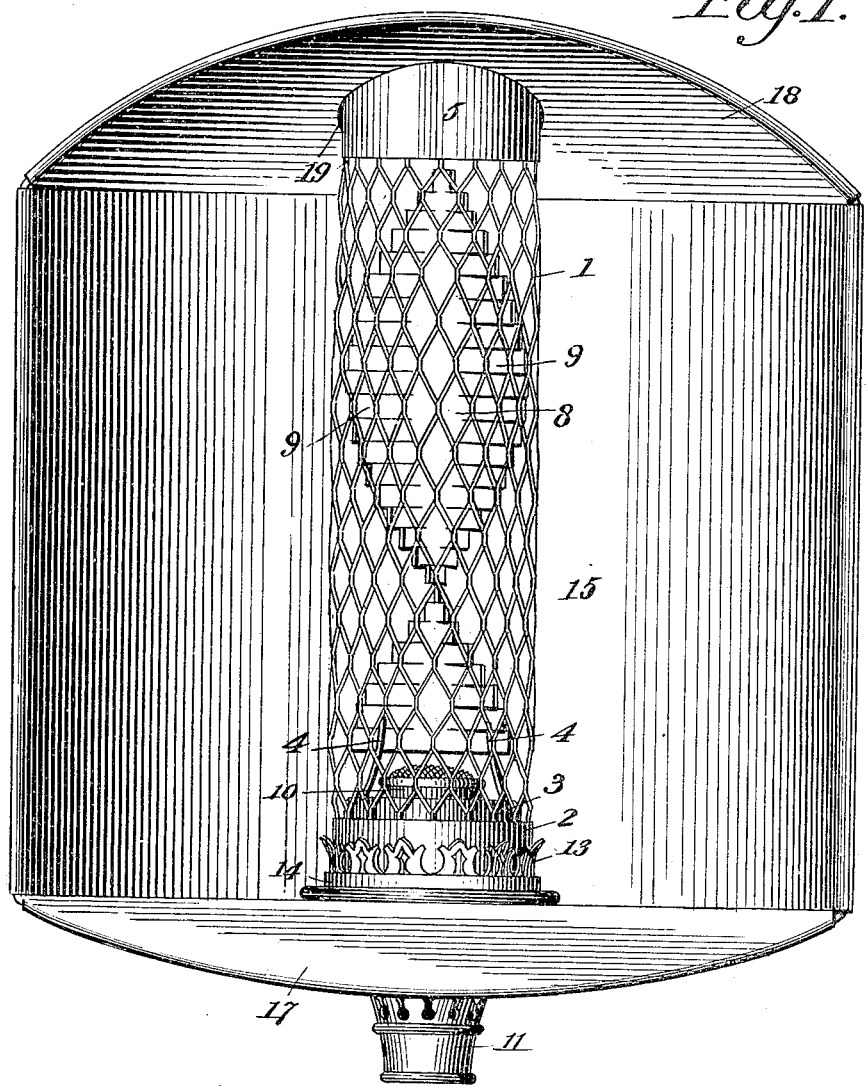

T. G. PALMER.
HEATER.
APPLICATION FILED DEC. 21, 1912.

1,125,387.

Patented Jan. 19, 1915.
2 SHEETS—SHEET 1.

Witnesses.
Inventor.

T. G. PALMER.
HEATER.
APPLICATION FILED DEC. 21, 1912.
1,125,387.
Patented Jan. 19, 1915.
2 SHEETS—SHEET 2.
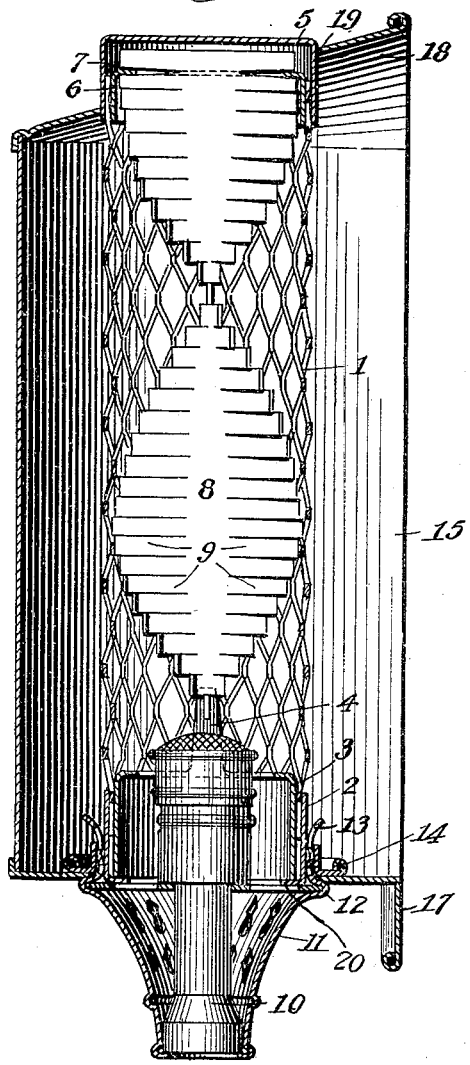
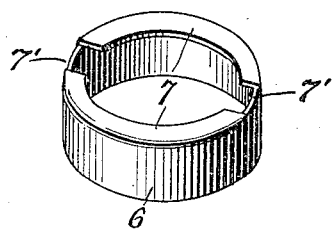
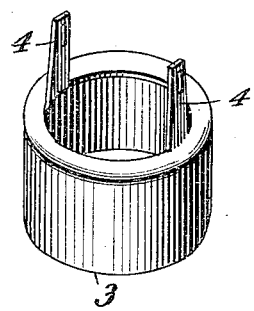
Witnesses.
Inventor.

UNITED STATES PATENT OFFICE.

TRUMAN GARRETT PALMER, OF CHICAGO, ILLINOIS.

HEATER.

1,125,387.

Specification of Letters Patent.

Patented Jan. 19, 1915.

Application filed December 21, 1912. Serial No. 737,985.

*To all whom it may concern:*

Be it known that I, TRUMAN G. PALMER, a citizen of the United States, residing in Chicago, county of Cook, State of Illinois, have invented certain new and useful Improvements in Heaters; and I do hereby declare the following to be a full, clear, and exact description of the invention, such as will enable others skilled in the art to which it appertains to make and use the same.

The invention relates to certain improvements in gas heaters of the type shown in my prior United States Patent, No. 972,905, involving a metallic heating shell with an interior baffle associated with a suitable reflector, and has for its object to provide a novel construction of shell and accessories to produce a rigid unit that may be readily applied to the burner to rigidly support the shell and the baffle therein contained in vertical alinement above the burner, and also admit of the parts being readily removed for cleaning, adjustment, and repair or replacement, associated with a reflector carried by the burner and firmly locked thereto so as to prevent any accidental displacement of the parts, the whole being so constructed and arranged that the individual parts may be applied and replaced by ordinary unskilled labor, and the efficiency of the heater insured without the exercise of the usual care and attention required by devices of this general character.

The invention is illustrated in the accompanying drawings, in which,

Figure 1 is a front elevation of the heater adapted to be applied to the ordinary form of gas outlet. Fig. 2 is a vertical transverse section through the heater. Fig. 3 is a detail of the upper interior sleeve supporting the shell. Fig. 4 is a corresponding view of the lower interior sleeve.

Referring to the drawings, 1 indicates the heater shell preferably formed of a sheet of foraminous metal, cut to size and rolled to form a hollow cylinder, with the lateral edges thereof brought into juxta-position. The shell is retained in its cylindrical form by means of telescoping sleeves which engage the upper and lower ends of the shell interiorly and exteriorly. The lower exterior sleeve 2 is preferably provided with an inturned flange 20 on its bottom against which the lower edge of the shell 1 rests, so that the interior of the sleeve embraces the exterior of the shell and clamps the same firmly against the exterior of the inner sleeve 3, which latter is provided with upstanding perforated lugs 4, the purpose of which will be explained later. By this arrangement, the lower end of the shell is held firmly in position by the telescoping sleeves, as indicated more particularly in Fig. 2 of the drawings. The upper end of the shell 1 is held and located firmly between an outer sleeve 5, preferably formed as a cap with imperforate top, and an inner telescoping sleeve 6, which latter is provided with inturned lugs or flanges 7 for a purpose to be hereinafter explained. As thus assembled, the shell and its associated telescoping sleeves constitutes a rigid cylindrical structure which may be freely handled and which will not be deformed under any ordinary conditions of use or by the high degree of heat developed by the burning gas.

Axially disposed within the shell 1 is a baffle 8, of the same general character as that described in my prior patent aforesaid, consisting of a sheet of plate or metal having a longitudinal series of laterally offset vanes or fins 9 which radiate from the longitudinal axis of the shell and are disposed in helical arrangement so as to impart a twisting movement to the products of combustion and to cause the latter to heat the baffle throughout its length.

Inasmuch as the baffle is a necessary component part of the heater, it is desirable that the said baffle when assembled with the heater shall occupy a proper position centrally, or in the longitudinal axis of the shell, so that the entire device including the shell and its baffle may be readily assembled and applied to the burner and as readily removed for inspection, cleaning, repair or replacement. To these ends the baffle, as indicated, is supported at its lower end in two upturned lugs or ears 4, 4, formed on the lower ring 3 by passing the outer ends of the two lowermost radial fins 9 through the openings in the lugs 4. This arrangement affords an efficient support for the baffle under normal conditions and serves to retain the baffle accurately centered within the shell. After long continued use, however, the lower portion of the baffle may disintegrate to some extent under the action of the high heat of combustion, for which reason it is desirable to support the baffle at some higher point within the shell so that even though the supporting connection between the lower part of the baffle and the lower sleeve member is rendered ineffective, the baffle will nevertheless be held suspended centrally within the shell. This object is attained by providing the inner member 6 of the upper telescoping sleeves with inwardly projecting lugs or flanges 7 over which the upper fins or vanes are slipped, as indicated in Fig. 2, the said lugs or flanges 7 lying between the edges of adjacent fins and therefore serving to lock the baffle in suspended relation within the shell, from which it cannot be displaced except by deliberate intention. The openings 7' permit the baffle to be inserted through the sleeve 6 until the flanges 7 are substantially in line with the first slit in the baffle forming the first two fins. A twisting movement imparted to either the sleeve or the baffle then causes the flanges 7 to enter the slit between the fins, as clearly shown in Fig. 2.

The shell 1 with its telescopic locking end sleeves 2 and 3, 5 and 6 and its centrally disposed baffle 8 supported between and locked to the inner sleeves of the two series, therefore constitutes a unitary structure which may be cheaply manufactured and quickly assembled and sold as an article of commerce for ready application to the heater. The device as thus constructed is self-contained, not liable to derangement and is capable of being applied by ordinary unskilled labor. Furthermore, by dismantling the parts of the device, the whole structure may be thoroughly cleaned and any parts which may have deteriorated may be readily replaced.

The unitary structure involving the heating shell and baffle with the associated locking sleeves is adapted to be applied to an ordinary gas burner of the Bunsen type, in much the same manner that a cylindrical glass chimney is applied, namely by slipping the lower end of the shell carrying the sleeve 2 within the retaining spring flange of the ordinary type of gallery. Such a burner is exemplified in the drawings by the numeral 10, and it will be understood, of course, that the usual type of air regulating mechanism is provided. The gallery 11, which is formed as a component part of the burner, is provided with an annular rim or flange 12 above which extends the spring flange 13 for holding the shell in place.

The rim or flange 12 serves to support a reflector 15 having curved back and side walls to reflect the heat in any desired direction. The bottom of the reflector is preferably made flat and is reinforced along its front edge by a pendant skirt or apron 17 which is curved along its lower edge to produce the effect of general symmetry with the upper curved top portion 18 of the reflector. The bottom plate is provided with a circular orifice adapted to receive the gallery 11 and to support the reflector on the flange 12 of said gallery. In order to lock the reflector to the gallery, a retaining ring 14 is provided to snugly fit the exterior of the spring flange of the gallery and overlie the rim of the bottom opening of the reflector above the flange 12 so that when said ring 14 is sprung into place over the flange 13 of the gallery, the reflector is securely locked in position on the gallery between flange 12 and ring 14. Preferably the upper portion of the reflector is provided with an opening 19 in alinement with the bottom opening through which opening 19 the upper cap-like sleeve 5 projects. By making a comparatively neat fit between the cap 5 and the upper opening 19 of the reflector, the shell 1 is provided with additional means for holding it in accurate vertical alinement with the burner 10. To release and remove the shell and its associated parts from the burner and the reflector, it is necessary only to lift the shell from the gallery, move the lower portion thereof forward and withdraw the upper end downward through the hole in the reflector. To replace the shell, the operation is reversed, namely, the upper end is inserted through the hole in the upper end of the reflector until the lower end of the shell clears the gallery and can be brought into alinement with the burner, after which the shell is lowered into place on the gallery. When so assembled, the apparatus involves a compact, rigid structure adapted to be applied to any standard gas fixture or outlet with the shell and its baffle held accurately in vertical alinement above the burner and the entire device including the reflector may be turned or adjusted on the gas fixture to direct the heat to any desired portion of the room or space to be heated.

What I claim is:—

1. A heater comprising a cylindrical openwork shell, telescoping sleeves engaging the interior and exterior of the lower end of said shell, a baffle axially disposed within the shell, and means on the interior sleeve for supporting said baffle.

2. A heater comprising a cylindrical openwork shell, telescoping sleeves engaging the interior and exterior of the upper and lower ends of said shell, a baffle axially disposed within the shell, and means on the upper and lower sleeves for locking said baffle in position.

3. A heater comprising a heating shell, a burner including a gallery supporting said shell, a reflector supported directly by said gallery, and a clamping ring surrounding said gallery and locking the reflector thereto.

4. A heater comprising a heating shell, a burner including a gallery supporting said shell, a reflector having a centrally perforated bottom resting on said gallery, and a clamping ring surrounding said gallery and engaging the bottom of the reflector surrounding the opening therein to lock the reflector to the gallery.

5. A heater comprising a heating shell, a burner including a gallery supporting said shell, a reflector supported directly by said gallery and having an opening at its top through which the shell projects, and a clamping ring surrounding said gallery and locking the reflector thereto.

6. A heater comprising a cylindrical heating shell, telescoping sleeves engaging the interior and exterior of said shell to maintain the cylindrical form thereof, a baffle axially disposed within the shell, and means associated with said sleeves for locking said baffle in position.

7. A heater comprising a cylindrical open-work heating shell rolled to form a cylinder, a baffle axially disposed within the shell, a sleeve engaging the lower end of the shell, and means on the sleeve for supporting said baffle.

8. A heater comprising a cylindrical open-work heating shell rolled to form a cylinder, a baffle axially disposed within the shell, a sleeve engaging the upper end of the shell, and means on the sleeve for locking said baffle in position.

9. A heater comprising a cylindrical open-work heating shell, a baffle disposed within the shell, a burner beneath the said shell, a reflector supported directly by said burner, and means for locking the bottom of the reflector directly thereto.

10. A heater comprising a cylindrical open-work heating shell, a baffle axially disposed within the shell, a burner beneath said shell, a reflector supported directly by said burner, and a clamping ring surrounding said burner and locking the reflector directly thereto.

In testimony whereof I affix my signature, in presence of two witnesses.

TRUMAN GARRETT PALMER.

Witnesses:
M. ROSENBERG,
HARRY A. AUSTIN.

Copies of this patent may be obtained for five cents each, by addressing the "Commissioner of Patents, Washington, D. C."